United States Patent [19]

Neumann

[11] 4,409,871
[45] Oct. 18, 1983

[54] SHEAR FOR BAR STOCK

[75] Inventor: David H. Neumann, Brooklyn Hts., Ohio

[73] Assignee: Automation Development Corporation, Mentor, Ohio

[21] Appl. No.: 294,187

[22] Filed: Aug. 18, 1981

[51] Int. Cl.³ .............................................. B23D 21/00
[52] U.S. Cl. ........................................ 83/104; 83/198; 83/545; 83/694; 83/859
[58] Field of Search ................. 83/104, 167, 198, 545, 83/635, 694, 859, 860, 698

[56] References Cited

U.S. PATENT DOCUMENTS 3,972,257  8/1976  Lazar, Jr. ............................... 83/198

Primary Examiner—James M. Meister
Attorney, Agent, or Firm—Pearne, Gordon, Sessions, McCoy, Granger & Tilberry

[57] ABSTRACT

A horizontal hydraulic bar stock shear is disclosed having three spaced bolsters which are clamped toward each other by four tie rods. A piston and cylinder actuator is located on one side of a central bolster and a die set assembly is mounted on the other side of the center bolster. A pair of mounting yokes are provided adjacent to the associated bolsters and the die set elements are clamped at their ends against such yokes. The end-clamped elements include a pair of side plates which laterally locate the dies. A manually removable cover assembly closes the upper side of the dies and the dies are supported on spaced rails which provide openings through which debris can fall out of the die assembly.

19 Claims, 7 Drawing Figures

SHEAR FOR BAR STOCK

BACKGROUND OF THE INVENTION

This invention relates generally to shears for rod or bar stock and, more particularly, to a hydraulically operated shear having a novel and improved die assembly.

PRIOR ART

The U.S. Pat. No. 3,972,257 to Lazar describes a horizontal hydraulic shear having a die assembly supported between two bolsters in which a pair of die retainer side plates are positioned at their ends in grooves formed in the bolsters. Top and bottom plates are supported on tie rods which extend through the bolsters to clamp the bolsters together. The top and bottom plates bridge across the side plates and provide interlocking grooves which absorb lateral reaction forces produced during the shearing operation.

Such structure requires the machining of accurate locating grooves on the large bolster members and the various plates of the dies sets. Further, in such structure, there is no provision for the discharge of scale or other debris which can cause excessive wear if allowed to remain within the die assembly. Such patent is incorporated in its entirety by reference.

SUMMARY OF THE INVENTION

There are several aspects to the present invention. In accordance with one aspect of the invention, a shear structure is provided in which the operating parts of the shear can be easily changed or serviced. For example, the cover plate assembly may be removed without the use of tools as a simple manual operation. Once the cover assembly is removed, full access is provided to the sheaar dies, and the movable die can be removed by merely lifting it out of the die housing assembly. Further, the stationary die is easily removable after retaining bolts are removed.

In accordance with another important aspect of this invention, the die housing assembly is provided with a large bottom opening through which debris is free to fall to eliminate the likelihood of unnecessary wear. Further, the structure is arranged to minimize locations where debris can collect. For example, the dies are supported on spaced support runners which have, in the illustrated embodiment, a width less than the die thickness. Therefore, debris does not collect on the runners and large openings are provided through which debris can fall out of the die area. In addition, the die assembly mounting plates or yokes are provided with sloping surfaces to prevent the accumulation of debris.

In accordance with still another aspect of this invention, the die assembly is mounted in position by a pair of spaced mounting plates or yokes located against associated bolsters. Such yokes locate the retainer plates at their ends. Mating surfaces on the yokes and on the end-mounted parts provide a sample mounting of the various parts. The yokes function to absorb the secondary shear loads; however, direct shearing loads are transmitted directly to the bolster.

The overall structure is arranged to provide high production rates and ease of servicing, and to minimize unnecessary wear.

These and other aspects of this invention are illustrated in the drawings, and are more fully described in the following description.

DETAILED DESCRIPTION OF THE DRAWINGS

Figure 1:
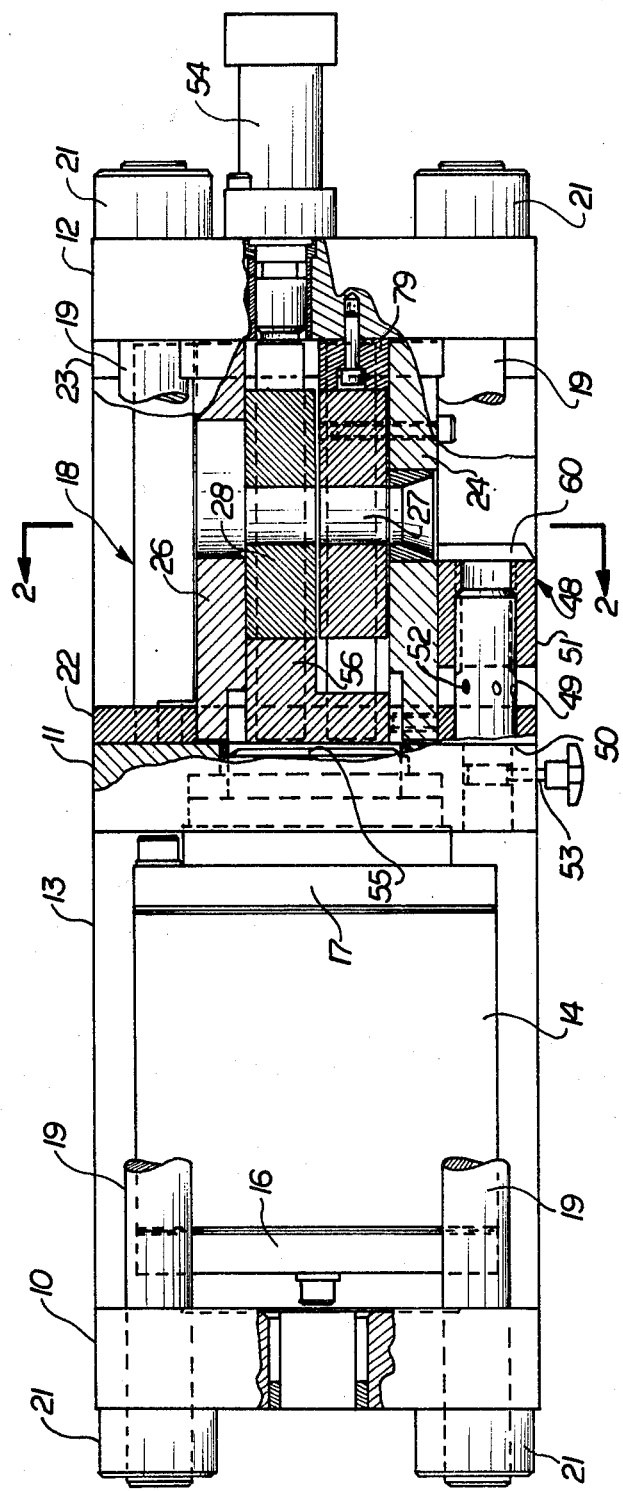
FIG. 1 is a plan view, partially in section, of a shear incorporating the present invention.
Figure 2:
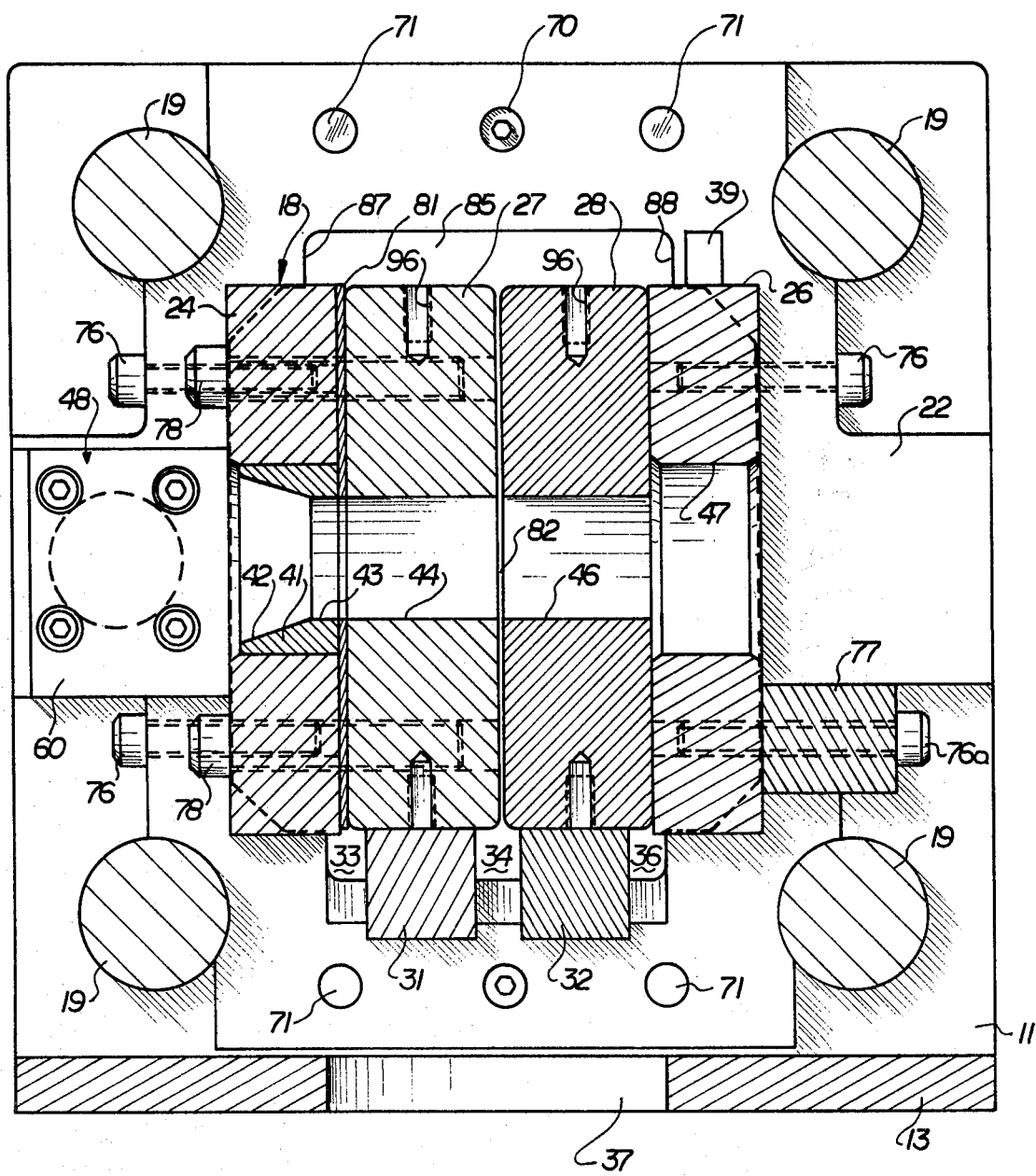
FIG. 2 is a cross section taken generally along 2—2 of FIG. 1, illustrating the structural detail of the die set with the cover plate removed for purposes of illustration.

Referring to FIGS. 1 and 2, the illustrated shear incorporating the present invention includes three spaced bolsters 10, 11, and 12 which are supported on a base plate 13. Mounted between the bolsters 10 and 11 is a hydraulic piston and cylinder actuator 14. The cylinder heads 16 and 17 are respectively clamped into mating recesses formed in the bolsters 10 and 11 to support the cylinder.

A die set assembly 18 is mounted between the bolsters 11 and 12 in a manner described in detail below. Four tie rods 19 extend through the three bolsters 10–12 and are provided with nuts 21 at each end which operate when tightened to clamp the three bolsters toward each other for securing the various machine parts together.

The die set assembly 18 includes a pair of yokes 22 and 23 respectively secured to the adjacent faces of the bolsters 11 and 12. These yokes provide means for supporting the various elements of the die set when the bolsters are clamped toward each other.

The die set includes a pair of spaced and parallel side plates 24 and 26 mounted at their ends on the yokes 22 and 23. A stationary die 27 is positioned against and supported by the retainer plate 24. A movable die 28 is positioned between the stationary die 27 and the side plate 24, and is supported for longitudinal reciprocating movement. A first support rail 31 is positioned below the stationary die 27 to vertically support the stationary die. A second support rail 32 is positioned below the movable die 28 and operates to support the movable die as such die reciprocates back and forth during the operation of the shear. The two support rails 31 and 32, like the side plates 24 and 26, are clamped at their ends between the yokes 22 and 23. As best illustrated in FIG. 2, the support rails 31 and 32 have a lateral width less than the lateral width of the associated dies 27 and 28, so that they are spaced from each other to provide longitudinal openings 33, 34, and 36 through which debris can fall out of the die set. This prevents the accumulation of wear producing debris within the die set. An opening 37 is provided in the support plate 13 to allow the debris to fall out of the machine into a suitable collection bin (not illustrated).

Figure 3:
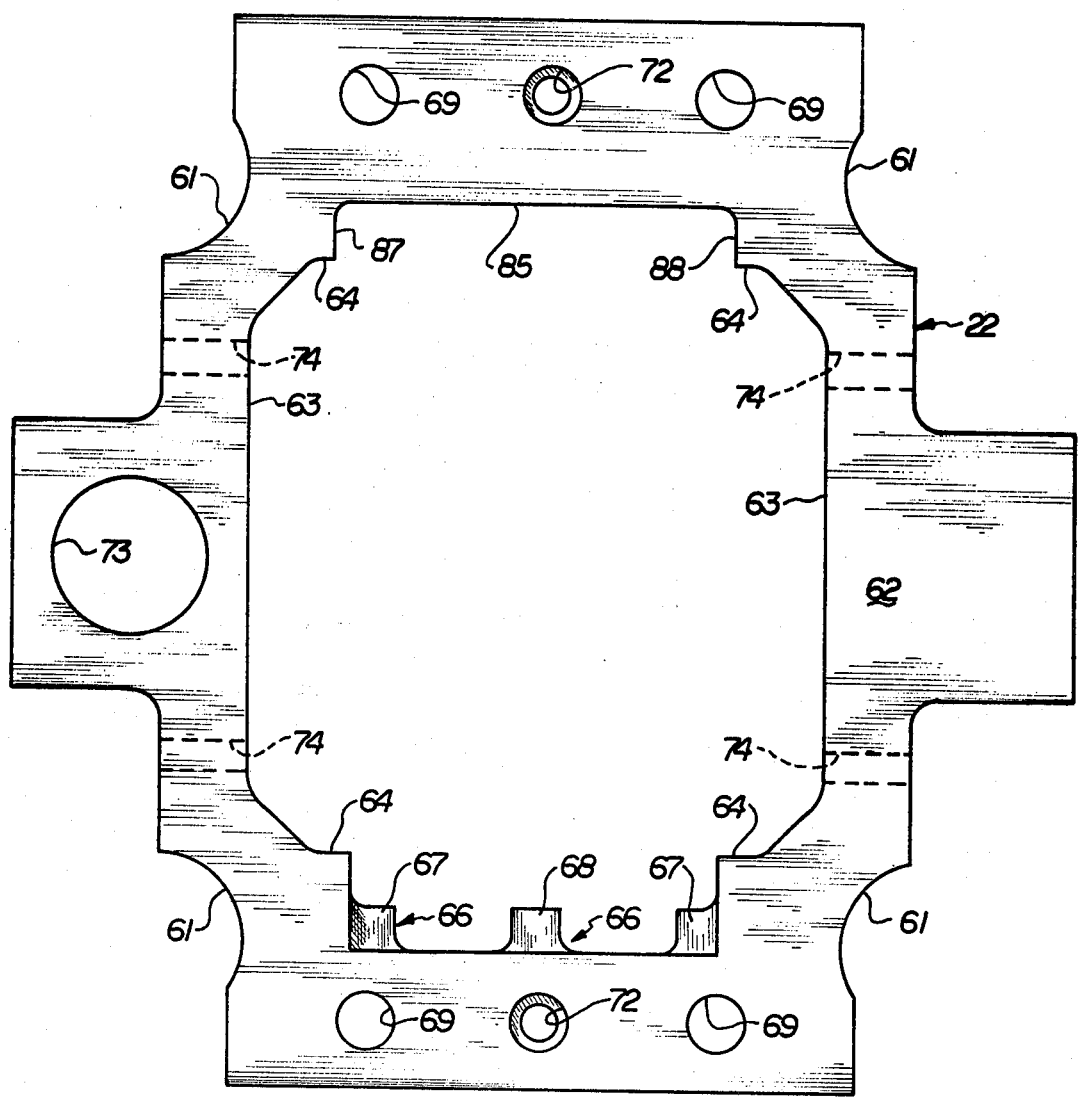
FIG. 3 is a view of one of the yokes used to support the die set assembly.
Figure 4:
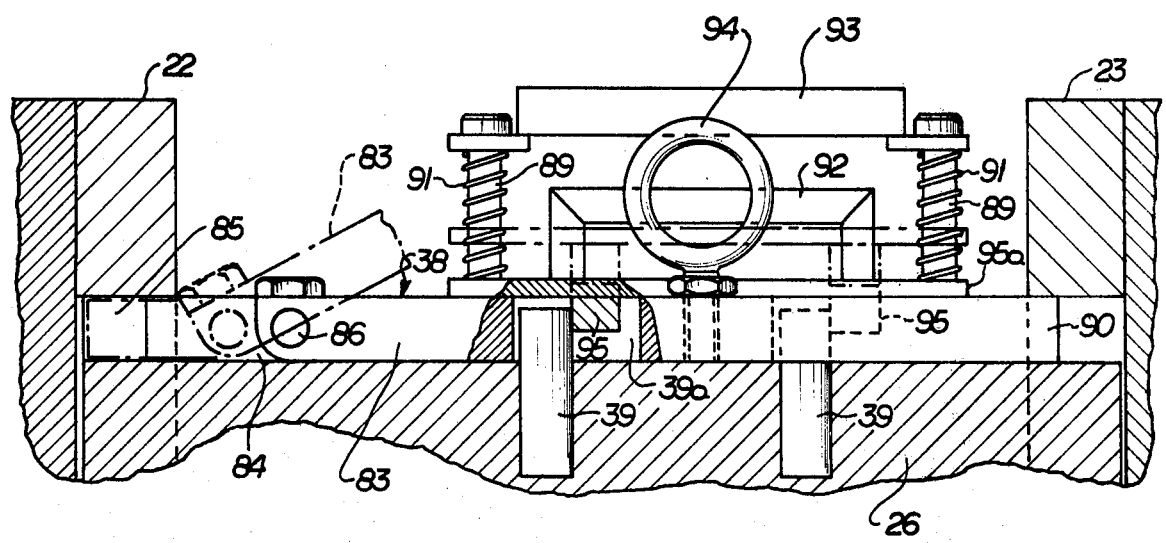
FIG. 4 is a fragmentary side elevation of the removable cover plate assembly.

A cover plate assembly 38 illustrated in FIG. 4 (removed in FIGS. 2 and 3 for purposes of illustration) is removably positioned above the side plates 24 and 26 and the two dies 27 and 28. Such assembly is removably supported at its ends on the two yokes 22 and 23. Such cover plate assembly, in cooperation with dowel pins 39 mounted in the side plate 26, provides lateral support for such side plate and, in addition, covers the die area and provides additional guiding of the movable die 28. As discussed in detail below, the cover plate assembly 38 is easily removable without requiring any tool or the like when access to the dies is required.

Referring again to FIG. 2, the side plate 24 is provided with a guide insert 41 having a conical entrance portion 42 which functions to center the end of the stock entering the shear and a uniform diameter bore 43 aligned with a bore 44 formed in the stationary die 27. A similar bore 46 formed in the movable die 28 is aligned with the bore 44 when stock is to be fed into the shear and is displaced from the bore 44 to provide the shearing operation. The side plate 26 is provided with clearance opening 47 through which the stock extends with clearance. Such opening 47 is elongated in the direction of movement of the movable die 28 so that the walls of the opening are not engaged by the sheared piece of stock as it is carried longitudinally of the shear with the movable die 28.

An adjustable stock support assembly 48 is adjustably mounted adjacent to the entrance side of the shear to engage and support the stock to prevent bending of the stock during the shearing operation. Such support assembly includes a screw 49 which extends into an apron opening 73 in the adjacent yoke and provides a radial shoulder 50 seated against the bolster 11. The forward end of the screw 49 is threaded into a rectangular block 51. Such block 51 is in engagement on one side with the adjacent surface of the side plate 24 and is thus prevented from rotating. An end plate 60 is bolted to the face of the block 51 to provide the actual stock-engaging surface.

Longitudinal movement of the block for adjustment purposes is accomplished by rotating the shouldered screw 49 to extend or retract the block. The shoulder 50 on the screw 49 engages the bolster 11 to absorb any loads imposed upon the block by the stock during the shearing operation. The screw is preferably formed with peripherally located openings 52 into which a suitable wrenching device is inserted to rotate the screw for adjustment. A lock screw 53 is threaded into the bolster 11 and engages an extension on the inner end of the screw 49 to lock the screw in the adjusted position.

A movable die return cylinder 54 is provided with a piston which engages the end of the movable die 28 and operates in timed relation to the operation of the actuator 14 to return the die to the stock feeding position after each shearing operation. The piston 55 of the actuator 14 engages an L-shaped shear drive block 56, which in turn engages the end of the movable die 28 so that when the piston 55 of the actuator 14 is extended, the movable die 28 is driven to the right, as viewed in FIG. 1, to perform a shearing operation. The two cylinders are connected to a source of fluid pressure through control valves to cause rapid reciprocation of the movable die. Further, a suitable stock feed is provided and the control system is normally arranged to time the shear and feed for automatic operation. Such controls and stock feed are known to persons skilled in the art and have therefore not been shown.

Figure 5:
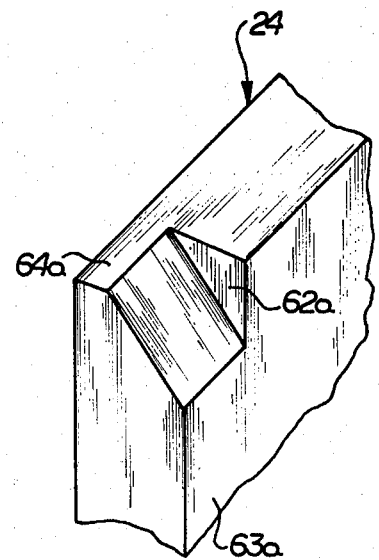
FIG. 5 is a fragmentary perspective of the end of one of the side plates illustrating the notch structure which fits against the associated yoke.

The two yokes 22 and 23 have a shape substantially as shown in FIG. 3. The yokes are formed with curved recesses 61 which are located and sized to closely fit the adjacent tie rods 19, as illustrated in FIG. 2. Further, the plate provides a lateral surface 62 against which the ends of the side plates 24 and 26 and the ends of the rails 31 and 32 are clamped when the nuts 21 on the tie rods are tightened. In addition, the yokes are each provided with axially extending surfaces 63 and 64, which are substantially perpendicular to each other and against which mating surfaces on the die plates 24 and 26 are clamped to properly position the side plates both laterally and vertically. FIG. 5 illustrates one of the notch structures provided at each corner of the side plates 24 and 26. When the side plates are mounted, the surface 62a engages and is clamped against the surface 62 on the associated yoke. Similarly, the surface 63a engages the surface 63 on the yoke to provide lateral positioning of the side plate and the surface 64a engages the associated yoke surface 64 for vertical positioning of the side plate.

Notches 66 cooperate with the adjacent portions of the lateral surface 62 to locate the rails 31 and 32. The notches provide lateral and horizontal walls to provide lateral and horizontal location of the rails and the lateral surface 62 adjacent each notch axially locates the rails when the bolsters are clamped up. The rails are notched to provide a surface which is clamped against the yoke surface 62 and a projection which extends into the associated notch 66.

In order to prevent the accumulation of debris, the surfaces 67 and 68 adjacent to the notches 66 are inclined back from the lateral face 62 at an angle of about 45 degrees. Therefore, any debris such as scale or the like dropping down against such surfaces tends to slide along the inclined surface and drop through the opening 37, further eliminating the tendency for debris to collect within the die set assembly.

For assembly purposes, the yokes are provided with four symmetrically positioned bores 69 which fit over dowel pins 71 (illustrated in FIG. 2) mounted on the adjacent bolsters to accurately locate the respective yokes with respect to their associated bolsters. Further, a bolt hole 72 is provided at the top and bottom of each yoke to receive a bolt 70 that threads into the associated bolster to hold the yokes in position during assembly. Once the system is clamped up, however, the bolts 70 do not perform any material function. Preferably, the holes 72 are counterbored so that the heads of the respective bolts 70 do not project beyond the face 62.

A relatively large diameter opening 73 receives the adjustment screw 49 illustrated in FIG. 1. Four lateral bolt holes 74 are also formed in the yokes so that bolts 76 can be threaded into the associated side plates 24 and 26 to hold them in place until the clamping operation is completed. The bolt 76a also functions to position a stiffener member 77 along the lower side of the die plate 26. Such member 77 functions to reinforce the side plate 26 against lateral forces developed during the shearing operation itself.

Substantially the only forces applied to the side plates are lateral, which are resisted by the engagement with the axial surfaces 63, so that the bolts 76 are not subjected to severe shear-induced loading. It is not necessary to bolt the rails 31 and 32 in place, since gravity retains them in proper position until they are clamped endwise and thereafter the clamping force retains such rails in their proper position.

The upper end of the side plate 26 is supported against lateral loading by the interengagement of the dowels 39 and the cover plate assembly 38, as discussed in greater detail below.

The fixed die 27 is secured to the side plate 24 by bolts 78. Since the strength of the fixed die 27 and the side plate 24 are additive, sufficient stiffness is provided to absorb the lateral shear-induced loads without extra support members such as the member 77. A spacer block 79 (illustrated in FIG. 1) is positioned between the end of the fixed die 27 and the bolster 12 to absorb the axial shearing loads which is the principal load applied to the dies. With this structure, the axial loading resulting from the shearing loads is absorbed directly into the heavy bolster 12 and is not transmitted to any appreciable extent through the side plates or the support rail 31.

Preferably, a shim 81 is positioned between the side plate 24 and the fixed die 27. The clearance 82 between the fixed and movable dies 27 and 28 is established by the selection of the shim 81. With this structure, the proper clearance can be re-established after the dies are reground by selecting the proper thickness of the shim 81.

Referring to FIG. 4, the cover plate assembly 38 includes two plates 83 and 84, which are pivotally connected by a hinge pin 86. The end of the plate 84 has a lateral width and thickness so that it can project with a close fit into a recess 85 between the axial faces 87 and 88 formed in the associated yoke. The opposite end of the plate 83 is also provided with a projecting portion 90 which projects between surfaces 87 and 88 of its associated yoke 23. In the installed position illustrated in FIG. 4, the two ends of the cover plate assembly 38 project into the openings 85 in the associated yokes 22 and 23 and engage the upper side of the dies and side plates to cover the die area.

The dowels 39 on the side plate 26 project into grooves 39a in the plate 83, so that the upper side of the die plate 26 is laterally supported by the cover plate assembly. A pair of projections 95 carried by a plate 95a extend down beyond the dowels and normally prevent movement of the cover plate assembly to the left as viewed in FIG. 4. The plate 95a is positioned by a pair of pins 89 mounted on the plate 83, and is resiliently urged in a downward direction by a pair of springs 91. A handle 92 extending upwardly from the plate 95a, and in cooperation with a handle element 93 carried by the pins 89, permits the easy manual release of the cover plate assembly.

When it is desired to release and remove the cover plate assembly, the operator merely squeezes the two handles 92 and 93 toward each other against the action of the springs 91, lifting the projections 95 from behind the dowels 39. When the projections are clear of the dowels, the cover plate assembly is moved to the left, causing the plate 84 to project further into the opening in the associated yoke 22 and moving the end 90 of the plate 83 clear of the yoke 23. The plate 83 is then pivoted up, as indicated in phantom, until the end of the plate 83 is clear of the yoke 23. Removal is then completed by sliding the assembly to the right, as viewed in FIG. 4, until the plate 84 is clear of its associated yoke 22. An eye 94 may be provided in larger machines where the cover plate assembly is relatively heavy to permit the use of a power hoist or the like to support the cover plate assembly during its removal and reinstallation.

Figure 6:
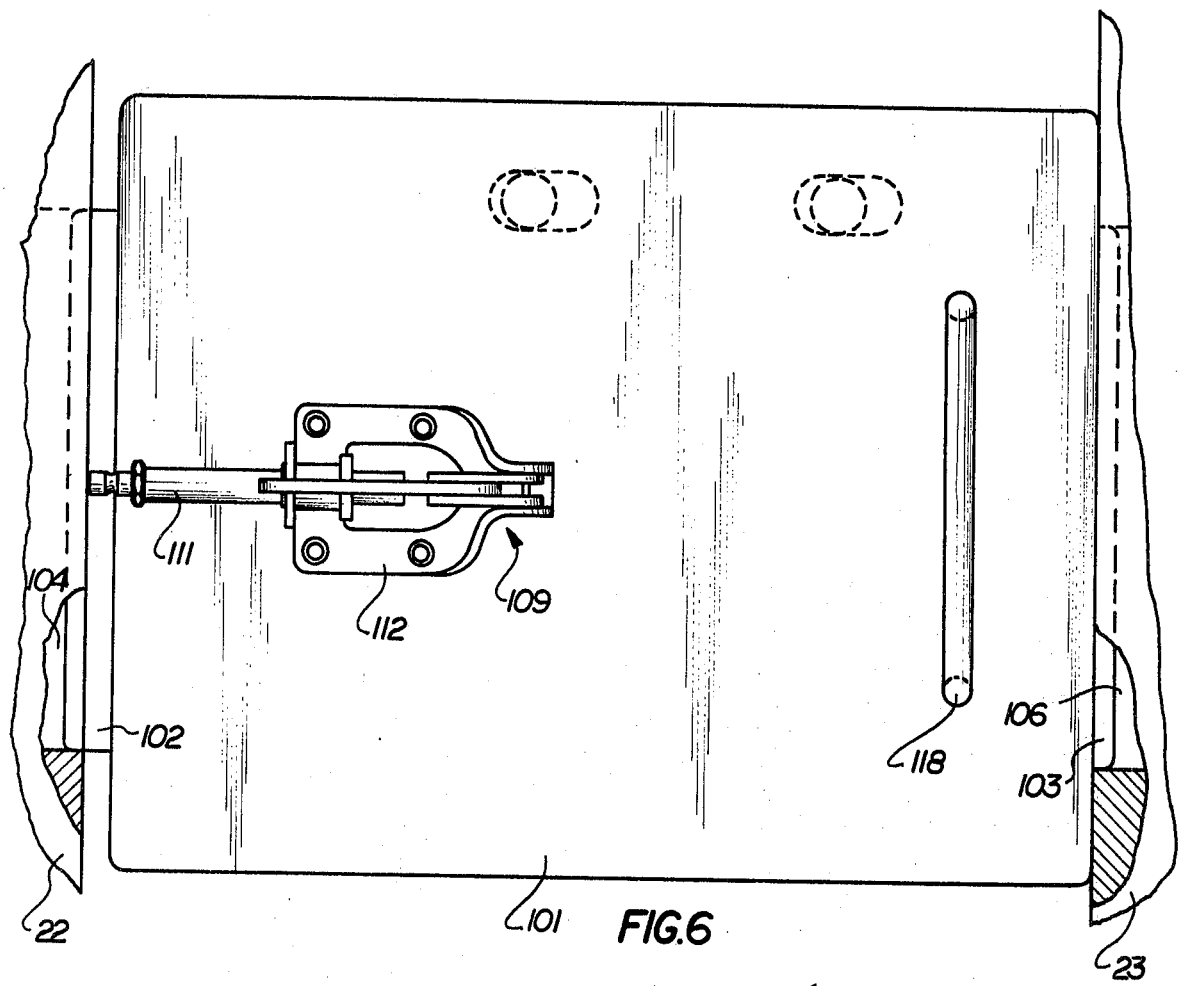
FIG. 6 is a fragmentary plan view of a modified removable cover plate in accordance with a second embodiment.
Figure 7:
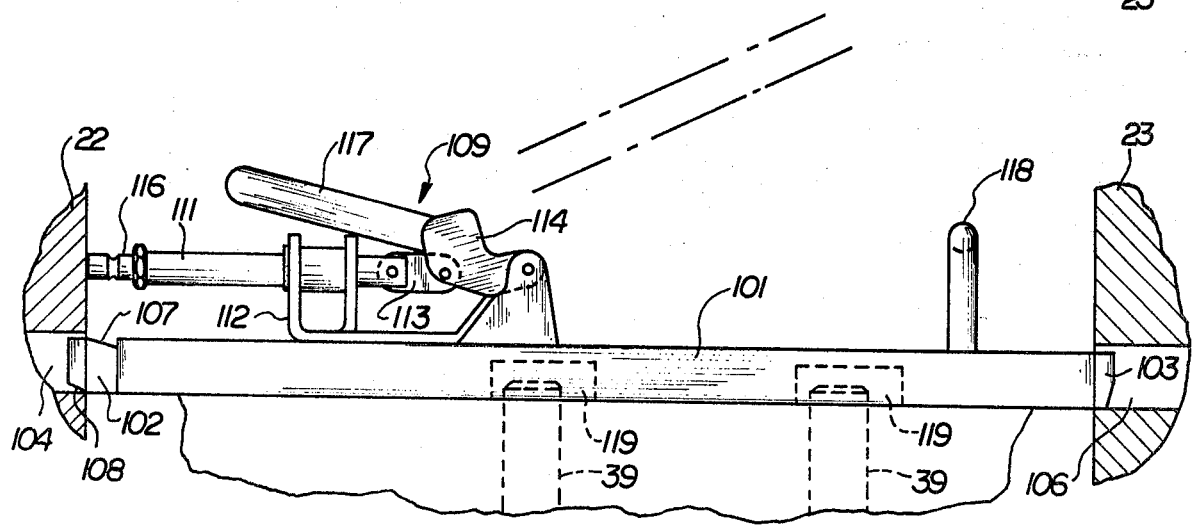
FIG. 7 is a side elevation of the cover plate of FIG. 6.

FIGS. 6 and 7 illustrate a second embodiment of the cover plate in accordance with the present invention. In such embodiment, a unitary plate 101 is formed with projections 102 and 103 proportioned to extend into recesses 104 and 106, respectively formed in the yokes 22 and 23. As best illustrated in FIG. 7, the projection 102 is formed so that it can move from the position illustrated to the left, as viewed in FIG. 6, a sufficient distance to cause the projection 103 to clear the recess 106. Further, the projection 102 is provided with inclined surfaces 107 and 108, which allow the plate to be tipped up to the phantom line position after it has been moved to the left so that the right end of the plate can be raised up clear of the yoke 22 for final removal. A toggle mechanism 109 includes an axially slidable bolt 111 supported in a bracket 112 for axial movement. The bolt 111 is connected through a pivoted toggle link 113 to an actuating lever 114 pivoted on the bracket 112. An adjustment screw mechanism 116 permits adjustment of the length of the bolt 111.

When the plate 101 is in proper mounted position and has been moved to the right to position the projection 103 in the recess 106, the toggle mechanism is operated by a lever 117 on the pivot lever 114 to the overcenter position, causing extension of the bolt 111 until the end thereof engages the yoke 22 to lock the plate 101 in the installed position. When it is desired to remove the cover plate 101, it is merely necessary to raise the lever arm 117 to release the toggle, allowing the plate 101 to slide to the left until the projection 103 clears the recess 106. The plate is then raised up by gripping a handle 118 thereon until the plate can be shifted to the right to cause the projection 102 to clear the recess 104.

Here again, the plate is formed with recesses 119 which fit over the dowel pins 39 to provide lateral support for the side plate 26 adjacent to its upper edge.

In some instances, in smaller-sized shears where the shearing forces are not as great, the bolster 10 at the rearward end of the cylinder 14 is not required and the cylinder can be bolted directly on the bolster 11 for its mounting. In such a modified form of this invention, the machine is provided with only the two bolsters 11 and 12, which are clamped together by shorter tie bolts. However, in such modified machine, the mounting of the dies and various other parts of the die set preferably remain as illustrated.

It should be noted that when die replacement is required, either to change the die size or to replace worn dies, it is merely necessary to manually remove the cover plate assembly to expose both of the dies 27 and 28. At such time, the movable die is free to be removed by merely raising it up out of the die set. The stationary die or fixed die 27 is similarly removed after removal of the bolts 78. Preferably, the two dies 27 and 28 are provided with threaded openings 96 so that a lifting eye can be threaded into the dies to allow the use of a power hoist to assist in die removal.

Because the die set assembly is supported on the two yokes, it is not necessary to perform any substantial amount of machining operations on the bolsters, which are large and heavy members. Instead, the various locating surfaces are provided on the lighter, easier-handled yoke members. Further, since the rails 31 and 32 are spaced from each other, large openings extend the entire distance between the yokes through which any scale or other debris can freely pass from the shear, eliminating excessive wear caused by the presence of such debris. Preferably, the rails 31 and 32 have a lateral width less than the respective dies 27 and 28, so that debris cannot collect on the rails and so that larger openings are available to allow the debris to fall from the machine die area.

Although preferred embodiments of this invention have been shown and described, it should be understood that various modifications and rearrangements of the parts may be resorted to without departing from the scope of the invention as disclosed and claimed herein.

What is claimed is:

1. A horizontal shear for bar stock or the like comprising first and second horizontally spaced bolsters, a hydraulic actuator mounted on the side of said first bolster remote from said second bolster, a die assembly mounted between said bolsters, and means to clamp said bolsters toward each other; said die assembly including a die set yoke positioned against each bolster, a pair of spaced and parallel side retaining plates extending between said yokes, said plates and yokes providing mating surfaces cooperating to position and retain said plates when said bolsters are clamped toward each other, a fixed die secured to one of said side plates, a movable die positioned between the other of said side plates and said fixed die for horizontal movement relative thereto, and a movable die support rail engaging the lower side of said movable die and extending between said yokes, said support rail and yokes providing mating surfaces which interengage to position and support said rail when said bolsters are clamped toward each other, said support rail having a width at least about as narrow as the width of said movable die and spaced laterally from adjacent parts of said die assembly to provide openings through which debris is free to fall out of said die assembly; said actuator being operatively connected to move said movable die for operation of said shear.

2. A horizontal shear as set forth in claim 1, wherein a removable cover assembly is supported at its ends by said yokes and encloses the upper side of said dies, said cover assembly being removable without requiring the use of tools.

3. A horizontal shear as set forth in claim 2, wherein said cover assembly is removable by axial movement in a first direction toward one end until its other end clears its associated yoke, and lock means normally prevent movement of said cover assembly in said one direction.

4. A horizontal shear as set forth in claim 3, wherein said lock means includes a spring-biased latch movable in a direction perpendicular to the direction of movement of said movable die whereby vibration caused by shear operation does not cause release of said latch.

5. A horizontal shear as set forth in claim 3, wherein said lock means is an overcenter toggle.

6. A horizontal shear as set forth in claim 3, wherein said cover assembly and said other plate provide a mating projection and recess operable to transmit lateral shear-induced forces from said other plate to said cover assembly, said cover assembly providing support of said other plate resisting at least part of said lateral force.

7. A horizontal shear as set forth in claim 6, wherein said projection is on said other plate and said latch engages said projection.

8. A horizontal shear as set forth in claim 2, wherein said cover assembly and said other plate provide a mating projection and recess operable to transmit lateral shear-induced forces from said other plate to said cover assembly, said cover assembly providing support to said other plate resisting at least some of said lateral forces.

9. A horizontal shear as set forth in claim 8, wherein a stiffener is secured to said other plate along the edge thereof remote from said cover assembly to assist in supporting said other plate against said lateral forces.

10. A horizontal shear as set forth in claim 2, wherein said cover assembly includes a pair of pivotally connected cover plates which are respectively supported at their ends by an associated one of said yokes, one of said cover plates being pivoted with respect to the other of said cover plates during installation and removal of said cover plate assembly.

11. A horizontal shear as set forth in claim 3, wherein said cover plate assembly includes a unitary plate having projections which fit into mating recesses to lock said plate in position, and at least one projection is shaped to allow the opposite end to be raised up with pivotlike movement when said plate is moved in said one direction.

12. A horizontal shear as set forth in claim 1, wherein a second support rail is positioned below and supports said fixed die, said rails being spaced from each other to provide an opening through which debris can pass out of said die assembly.

13. A horizontal shear as set forth in claim 12, wherein said yokes are formed with inclined surfaces between said rails to prevent accumulation of debris.

14. A horizontal shear as set forth in claim 1, wherein an adjustable stock support is positioned on the side of said one of said side plates to engage and support stock being sheared.

15. A shear for bar stock or the like, comprising first and second spaced bolsters, an actuator mounted on the side of said first bolster remote from said second bolster, means to clamp said bolsters toward each other, a mounting yoke mounted against each bolster on the side thereof adjacent to the other bolster, said yokes providing lateral surfaces and longitudinal surfaces, a boxlike die support enclosure assembly mounted at its ends on said yokes engaging said lateral surfaces and longitudinal surfaces to locate and support said enclosure assembly, said means to clamp said bolsters toward each other operating to clamp said enclosure assembly in position, said enclosure assembly including a pair of spaced and parallel side plates, a fixed die secured to one of said side plates and movable die being guided for reciprocating movement by said actuator between said fixed die and the other of said side plates, said enclosure assembly providing a removable cover assembly including cover plate means supported at its ends in an associated yoke, said cover assembly being removable by longitudinal movement in one direction until the remote end clears its associated yoke and thereafter by pivotal movement of said remote end to a position clear of said yokes, and means normally preventing movement of said cover assembly in said one direction.

16. A shear as set forth in claim 15, wherein said means for preventing said cover assembly from moving in said one direction includes a latch.

17. A shear as set forth in claim 15, wherein said means for preventing said cover assembly from moving in said one direction is a locking toggle.

18. A shear as set forth in claim 15, wherein said movable die is horizontally movable and said cover assembly is located on top of said dies.

19. A shear as set forth in claim 15, wherein openings are provided to allow free passage of debris from said enclosure assembly.

* * * * *